United States Patent [19]

Lee

[11] 4,012,964

[45] Mar. 22, 1977

[54] INTERMITTENT ROTARY MECHANISM

[76] Inventor: Yuan Ho Lee, 85, Jen Ho Road, Tainan, China /Taiwan

[22] Filed: Feb. 14, 1975

[21] Appl. No.: 550,002

[52] U.S. Cl. .................................. 74/435; 74/767; 74/793; 74/759

[51] Int. Cl.$^2$ .................................. F16H 55/04

[58] Field of Search ............ 74/435, 420, 84, 767, 74/793, 796, 789

[56] References Cited

UNITED STATES PATENTS

| | | | |
|---|---|---|---|
| 1,829,549 | 10/1931 | Snodgrass | 74/420 |
| 2,566,945 | 9/1951 | Laze | 74/435 |
| 2,671,929 | 3/1954 | Sayler | 74/435 |

FOREIGN PATENTS OR APPLICATIONS

| | | | |
|---|---|---|---|
| 543,691 | 7/1957 | Canada | 74/435 |

*Primary Examiner*—Samuel Scott
*Assistant Examiner*—Wesley S. Ratliff, Jr.
*Attorney, Agent, or Firm*—Lane, Aitken, Dunner & Ziems

[57] ABSTRACT

A high-speed intermittent rotary mechanism which includes two pairs of meshing driving gears and driven gears properly located respectively on driving and driven shafts with equal center-to-center distances. The driving gears are fixed on the driving shaft and the driven gears, which cooperate with an epicyclic train of gears, are pivotally mounted on the driven shaft by means of bearings. One or both pairs of the abovementioned meshing driving and driven gears are cam-shaped to transmit a smooth, accurate and intermittent rotary motion while in high speed operation.

11 Claims, 4 Drawing Figures

INTERMITTENT ROTARY MECHANISM

BACKGROUND OF THE INVENTION

The present invention relates to a high-speed intermittent rotary mechanism. More particularly, this invention relates to a mechanism which consists of a set of parallel shafts having two pairs of gears respectively mounted thereupon, wherein one pair or both pairs are cam gears. The driven shaft is rotatable by means of bearings, while two driving gears are fixed on the driving shaft at an axial location corresponding respectively to the corresponding meshing gears and the respective gear pairs have equal center-to-center distances. An epicyclic train of gears is also provided. A set of gears of the epicyclic train of gears are planet gears and are driven by one driven gear meshed with one driving gear. A ring gear of the epicyclic train is driven by means of the other driven gear meshed with the other driving gear thus causing the planet gear and the ring gear to revolve around a sun gear mounted on the driven shaft. A difference in speed between the ring gear and the planet gears will occur because of the change in the revolving radii of a pair of cam gears, and an intermittent rotary motion with periodic dwell-and-movement of the driven shaft is thus obtained.

In the conventional intermittent rotary mechanisms, a movement with a predetermined length is produced by a repeatedly periodical dwell-and-movement through the motive force of a driving shaft rotating at a constant speed. There are many kinds of such mechanisms with comprehensive applications. Usually, assemblies of intermittent gearing or of ratchet feeding mechanisms are used. In addition ratchets of the steel ball or the roller type, or coil spring ratchets and/or friction ratchet are also used. The main point concerning an intermittent rotary mechanism using an interrupted-tooth gear assembly or a ratchet feeding mechanism lies in that after the intermittent movement and during the stationary or dwell period, the driven gear cannot make any small rotation, thus requiring a device to confine motion. If not, while in the beginning of intermittent motion, the meshing of the interrupted-tooth gear will cause the gears in normal position to shift erroneously so that no satisfactory transmission can be obtained. In order to eliminate this defect, a convex surface is provided at a portion of the driving body of the gear assembly mentioned above. In addition, a concave surface is provided at the driven body opposite and corresponding to the convex surface, rendering the driving body, during idling, pressed tight between the concave surface and the convex surface, and effecting a sliding motion on the other side, to prevent errors between the meshed teeth of corresponding convex and concave shapes in the beginning of transmission. As to the ratchet wheel assembly, a click is generally provided for the prevention of reverse rotation and also to serve as a means for adjusting any abnormal rotations. This kind of intermittent movement device will generally give birth to a sudden and sharp impact action during start and stop. Therefore, it is impossible to obtain an accurate intermittent movement and such a device is inapplicable in high-speed operation for a driven body that requires a large transmitting power.

The primary objective of the present invention is to improve the defects mentioned above, and to provide an intermittent rotary mechanism in which several rotational bodies are pivotally connected by means of bearings. The assembly of a revolving wheel train of planet gears rotatable by means of pairs of cam gears is completely constituted of transmission gears, without any wearing parts and local frictions, thus eliminating completely the sudden and sharp impact action during the start and the stop of a general intermittent movement applicable in transmitting heavy items and for large motive forces at high speed and sensitivity with practically no noises.

Other objects, advantages and operating principles of the intermittent rotary mechanism according to the present invention will be understood from the following detailed description when read in light of the accompanying drawings.

BRIEF DESCRIPTION OF THE DRAWINGS

In the drawings:

FIG. 4 is a sectional view of a third embodiment of the intermittent rotary mechanism according to the present invention.

DETAILED DESCRIPTION OF THE PREFERRED EMBODIMENTS

Figure 1:
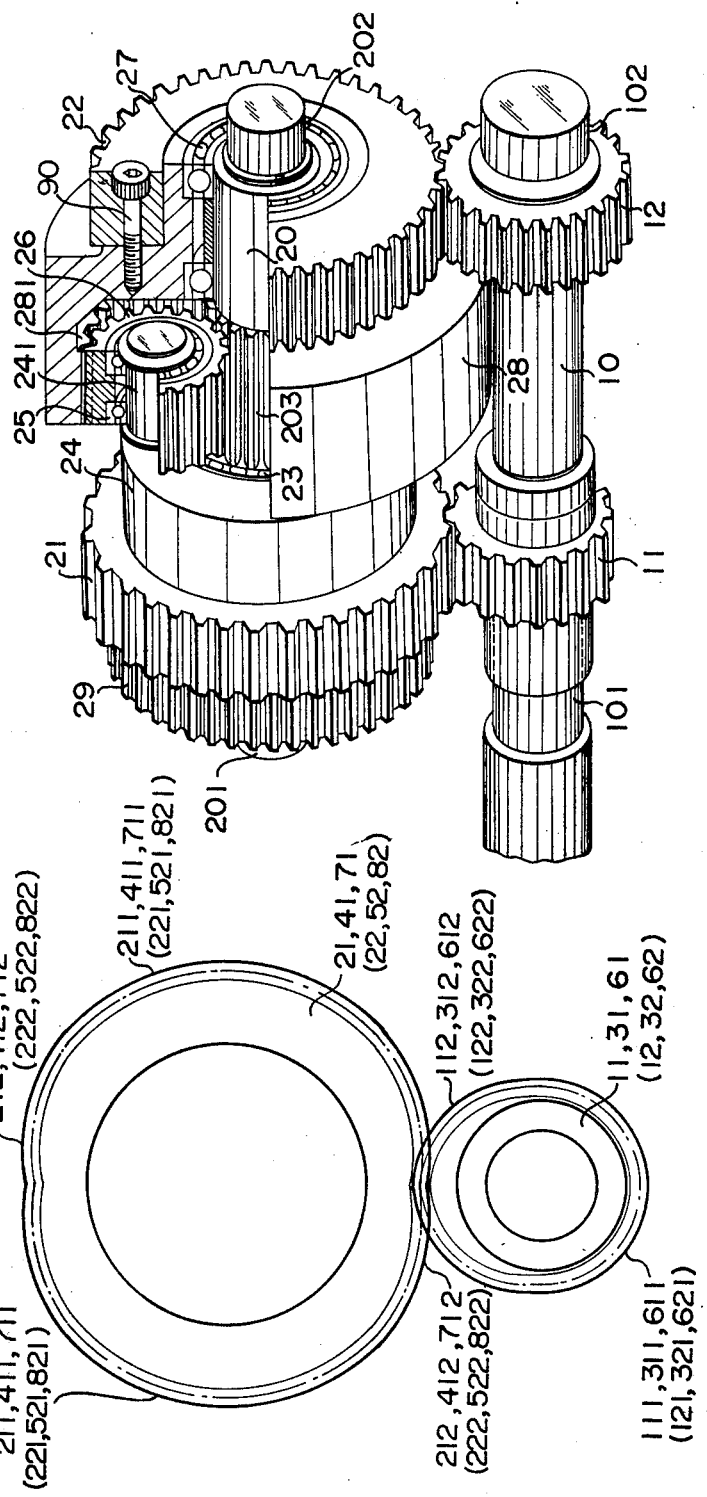
FIG. 1 is a elevational view partially in section, of an embodiment of the intermittent rotary mechanism according to the present invention.

As shown in FIG. 1, the construction of the first embodiment of the present invention comprises principally a driving shaft 10 and a driven shaft 20 arranged in parallel. A pair of driving cam gears 11 and 12 and a pair of driven cam or spur gears 21 and 22 are located on the driving shaft 10 and driven shaft 20 respectively with equal center-to-center distances. The driving cam gears 11 and 12 are meshed with the driven cam gears 21 and 22 as to drive the driven cam gears 21 and 22. When the driving shaft 10 is rotated the ends 101, 102 and 201, 202 opposite to the body wall of the driving shaft 10 and the driven shaft 20 respectively can be pivotally fixed with bearings (not shown). One driven cam gear 21 of the pair of the driven gears is connected with one side of a rotary wheel 24 and the other side of the rotary wheel 24 is pivotally connected with the driven shaft 20 by a bearing 23. The rotary wheel 24 includes at least two extending shafts 241 to connect pivotally with a set of plane gears 26 by means of a bearing 25. Moveover, the other driven gear 22 is fixed on the outer side of a ring gear 28 by bolts 90 (only one of which is shown). The ring gear 28 is meshed with the planet gears 26. the driven shaft 20 has an output gear 29 to transmit the action and a sun gear 203 to mesh with the planet gears 26 so as to be actuated by the other cam gear 27 of said one pair of driven cam gears through the ring gear 28 and the planet gears 26.

The construction of the first embodiment according to the present invention is mentioned above. Referring now to FIGS. 1 and 4, when the driving shaft 10 is actuated to rotate by transmitting means (not shown), both of the one pair of driving cam gears 11 and 12 are rotated respectively, whereupon the set of planet gears 26 and the ring gear 22 are revolved in an opposite direction around the sun gear 203 through one driven cam gear 21, the rotary wheel 24 with its extending shaft 241 and the other driven cam gear 22 respectively. Because driving cam gears 11 and 12 and the driven cam gears 21 and 22 are cam-shaped in design the speed of revolution of the planet gears 26 with the ring gear 28 is the same at the running position of the diameters 111, 211 meshed by one pair of cam gears 11, 21 and at the running position of the diameters 121, 221 meshed by the other pair of gears 12, 22. At the running positions at the diameters 112, 212 and 122, 222 of the one pair cam gears 11, 21 and the other pair cam gears 12, 22, the relative speed of rotation in the opposite direction between the planet gears 26 and the ring gear 28 is changed thereof. The sun gear 203 thus is rotated for one pitch by virtue of the differential speed until the running positions at the diameters 111 and 211 and 121 and 221, meshed by the pair gears 11 and 21 and the other pair gears 12, and 22. Thus causing an intermittent rotary motion with a periodical dwell-and-moving of said driven shaft 20 and said output gear 29.

Figure 2:
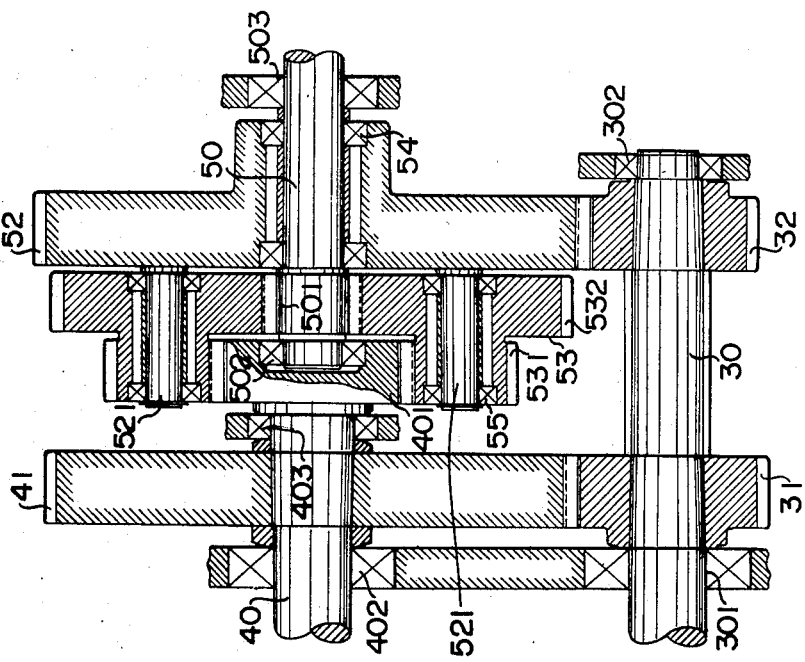
FIG. 2 is a front elevational view, partially in section, of a pair of cam gears according to the present invention.

Referring to FIG. 2, the second embodiment of the present invention, illustrates the driven shaft divided in two parts 50 and 40, but mounted together in a horizontal position. The first driven shaft 50 is the same as the driven shaft 20 mentioned in connection with the first embodiment. A cam gear 52 is pivotedly mounted on the first driven shaft 50 by bearings 54 and has at least two extending shafts 521 which are pivotally affixed to a step gear 53 and a sun gear 501. The second driven shaft 40 is pivotedly affixed by bearings 402 and 403 and has a spur gear 401 receiving the first driven shaft 50 by a bearing 502 and meshed with the pinion portion 531 of the step gear 53. The larger diameter portion 532 of the step gear 53 is meshed with the sun gear 501. The construction and the action of other elements of this embodiment, for example, the driving shaft 30, the driving cam gears 31, 32 with end wall 301, 302, and driven cam gears 41, 52 and so on, are the same as those in the first embodiment. Thus, further detailed description is omitted. The first driven shaft 50 will be rotated for one pitch at the running position of the diameters 312, 412 and 322, 522 meshed by a pair of cam gears 31 with 41 and the other pair of gears 32 with 52 until the running position is changed to the diameters 311, 411 and 321, 521 meshed by said one pair of cam gears 31 with 41 and the other pair of cam gears 32 with 52.

Figure 3:
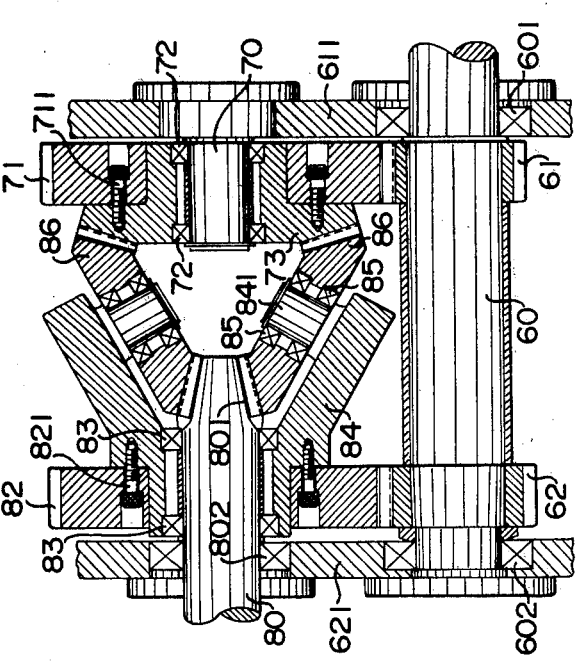
FIG. 3 is a sectional view of a second embodiment of the intermittent rotary mechanism according to the present invention.

As shown in FIG. 3, the third embodiment of the present invention, the main feature is the same as that of the first and the second embodiments. However, the construction of this embodiment is slightly different. The driving shaft 60 is affixed pivotally to the body walls 611 and 621 by bearings 601 and 602 and has two cam gears 61 and 62 meshed with two cam gears 71 and 82. The driven shaft is also divided in two portions 70 and 80 wherein a first bevel gear 73 is pivotally affixed to the first driven shaft 70 by bearings 72 and affixed to the cam gear 71 by bolts 711. A rotary wheel 84 is pivotedly fixed with the second driven shaft 80 by bearings 83 and affixed to the other cam gear 82 by means of bolts 821. The rotary wheel also has at least two extending shafts 841-841 which are pivotally affixed to a second bevel gear 86 by means of bearings 85. One side of the second bevel gear 86 is meshed with the bevel portion 801 of the second driven shaft 80 and the other side is meshed with the first bevel gear 73. At the running position of the diameters 622, 822 and 612, 712, meshed by one pair of cam gears 62 with 82 and the other pair of cam gears 61 with 71, the second driven shaft 80 will be rotated for one predetermined pitch by virtue of the differential speed between the first and the second bevel gears 73, 86 through the transmissions of one pair cam gears 61 with 71 and the other pair of cam gears 62 with 82 and rotary wheel 84 until the running position is changed to the diameters 612, 712 and 622, 822, meshed by the pair of cam gears 61 with 71 and the other pair of cam gears 62 with 82. At this time the second driven shaft 80 will then be stopped. An intermittent rotary motion with a periodical dwell-and-moving of said driven shaft 80 is produced since the driving shaft 60 is running continuously.

While the embodiments of the invention have been described in detail, it will be obvious to those skilled in the art that the invention is capable of modification and variation without departing from the spirit and scope of the claims.

What is claimed is:

1. A high-speed intermittent rotary mechanism comprising:
    a driving shaft,
    a driven shaft,
    means coacting with said driving shaft and said driven shaft for intermittently rotating said driven shaft in an intermittent rotary manner having a predetermined pitch and an intermittent dwell-and-movement motion, said rotating means including a revolving wheel train connected by two pairs of gears, each pair having an equal center-to-center distance between said driving shaft and said driven shaft, at least one of said two pairs of gears being cam gears, said gears being structurally adapted and related to cause the revolving wheel train to produce a differential speed through a variation in the meshing distances of said pair of gears from either of said shafts, thereby to provide an intermittent rotary movement of a predetermined pitch from the intermittent dwell-and-movement motion of the driven shaft.

2. The mechanism as set forth in claim 4 wherein the other pair of said two pairs of gears are either cam gears or spur gears.

3. A high-speed intermittent rotary mechanism as set forth in claim 5 wherein the revolving wheel train includes a rotary wheel fixed with one cam gear of said one pair of cam gears and having at least two extending shafts; a set of planet gears pivotally affixed on the extending shafts of the rotary wheel by means of bearings; a sun gear affixed to the driven shaft and meshed with said set of planet gears; and a ring gear affixed to a cam gear or spur gear of the other pair of gears respectively.

4. A high-speed intermittent rotary mechanism according to claim 1, wherein the revolving wheel train comprises a first bevel gear affixed to one cam gear of said one pair of cam gears and pivotally affixed to one driven shaft by bearings; a bevel-shaped rotary wheel affixed to one gear of the other pair of gears and also pivotally affixed to the other driven shaft by means of bearings, said bevel-shaped rotary wheel further having at least two extending shafts to pivot a second bevel gear, one side of said second bevel gear being meshed with the bevel-form portion of said second driven shaft and the other side of which being meshed with said first bevel gear.

5. The mechanism as set forth in claim 4 wherein the other pair of said two pairs of gears are either cam gears or spur gears.

6. The mechanism as set forth in claim 1 wherein said revolving wheel train comprises an epicyclic train of gears, said epicyclic train further including planet gears connected to one of the driven gears of said two pairs of gears through a rotary wheel which includes extending shafts, and planet gears being affixed to said extending shafts of the rotary wheel and a ring gear meshed with said planet gears and connected to the other driven gear of said pair of gears, said rotary wheel being connected to said driven shaft, and a sun gear fixed on said driven shaft and meshed with said set of planet gears, said epicyclic train of gears revolving about said sun gear.

7. The mechanism as set forth in claim 6 wherein said two pairs of gears are structurally adapted to produce in cooperation with said planet gears and said ring gears a differential speed of revolution and a dwell in the movement of said driven shaft by the rotation of said sun gear for one pitch resulting from said differential speed.

8. A high-speed intermittent rotary mechanism comprising
a driving shaft;
two gears mounted on said driving shaft;
an epicyclic train of gears;
a driven shaft connected to said epicyclic train of gears;
two gears mounted on said epicyclic train of gears and adapted to mesh with said two gears mounted on said driving shaft to constitute two pairs of gears, at least one of said two pairs of gears being cam gears;
thereby to provide an intermittent rotary movement of a pedetermined pitch including a dwell-and-movement motion of said driven shaft upon rotation of said driving shaft.

9. A high-speed intermittent rotary mechanism according to claim 8 wherein said epicyclic train of gears comprises: a ring gear, a sun gear, and a planet gear meshing with said ring gear and said sun gear.

10. A high-speed intermittent rotary mechanism according to claim 8 wherein said epicyclic train of gears comprises: a spur gear, a sun gear, and a step gear meshing with said spur gear and said sun gear.

11. A high-speed intermittent rotary mechanism according to claim 8 wherein said epicyclic train of gears comprises bevel gears.

* * * * *

UNITED STATES PATENT OFFICE
CERTIFICATE OF CORRECTION

Patent No. 4,012,964     Dated March 22, 1977

Inventor(s)  Yuan Ho Lee

It is certified that error appears in the above-identified patent and that said Letters Patent are hereby corrected as shown below:

Column 2, line 19, "elevational" should read -- perspective --;

Column 2, line 39, the period should be deleted;

Column 2, line 52, "plane" should read -- planet --;

Column 2, line 55, "the" should read -- The --;

Column 4, line 43, claim dependency which reads "4" should read -- 1 --; and

Column 4, line 47, claim dependency which reads "3" should read -- 2 --.

Signed and Sealed this fifth Day of July 1977

[SEAL]

Attest:

RUTH C. MASON  
*Attesting Officer*

C. MARSHALL DANN  
*Commissioner of Patents and Trademarks*